United States Patent
Tokoro (10) Patent No.: US 8,854,251 B2
(45) Date of Patent: Oct. 7, 2014

(54) OBJECT IDENTIFICATION DEVICE AND METHOD

(75) Inventor: Setsuo Tokoro, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 123 days.

(21) Appl. No.: 13/517,422

(22) PCT Filed: Jun. 16, 2010

(86) PCT No.: PCT/JP2010/004015
§ 371 (c)(1),
(2), (4) Date: Jun. 20, 2012

(87) PCT Pub. No.: WO2011/158292
PCT Pub. Date: Dec. 22, 2011

(65) Prior Publication Data
US 2013/0093614 A1    Apr. 18, 2013

(51) Int. Cl.
| | | |
|---|---|---|
| *G01S 13/93* | (2006.01) | |
| *G01S 7/40* | (2006.01) | |
| *G01S 13/34* | (2006.01) | |
| *G01S 13/536* | (2006.01) | |
| *G08G 1/16* | (2006.01) | |
| *G01S 13/00* | (2006.01) | |
| *G01S 7/00* | (2006.01) | |
| *G01S 13/46* | (2006.01) | |

(52) U.S. Cl.
CPC ............ *G01S 13/931* (2013.01); *G01S 13/34* (2013.01); *G01S 13/536* (2013.01); *G08G 1/166* (2013.01); *G01S 2013/462* (2013.01)
USPC .................. 342/70; 342/27; 342/28; 342/89; 342/90; 342/91; 342/104; 342/109; 342/118; 342/128; 342/165; 342/173; 342/175; 342/195; 342/196

(58) Field of Classification Search
CPC ........... G08G 1/16; G01S 13/93; G01S 15/93; G01S 17/93
USPC .............. 342/21, 22, 27, 28, 70–72, 89–115, 342/118, 128–133, 165–174, 175, 192–197, 342/159–162; 701/300, 301; 340/425.5, 340/435, 436, 988
See application file for complete search history.

(56) References Cited

U.S. PATENT DOCUMENTS 4,549,181 A * 10/1985 Tachibana et al. ............. 342/70
5,633,642 A *  5/1997 Hoss et al. ..................... 342/70
(Continued)

FOREIGN PATENT DOCUMENTS

JP       9 288178    11/1997
JP     2001 153946     6/2001
(Continued)

OTHER PUBLICATIONS

International Preliminary Report on Patentability Issued May 10, 2011 in PCT/JP10/004015 Filed Jun. 16, 2010.

(Continued)

*Primary Examiner* — Bernarr Gregory
(74) *Attorney, Agent, or Firm* — Oblon, Spivak, McClelland, Maier & Neustadt, L.L.P.

(57) ABSTRACT

Provided is an object identification device and a method for the same that are capable of identifying a three-dimensional object and a road surface static object, irrespective of situations. The object identification device identifies an object, based on a transmission signal and a reflection signal caused by the object reflecting the transmission signal. The object identification device includes: a measurement section configured to measure at least one of the relative distance and the relative velocity with respect to the object; an intensity detection section configured to detect the intensity of the reflection signal; and an object identification section configured to identify the object which can be an obstacle object, based on at least one of the relative velocity and the variation in the relative distance, and on the variation in the intensity.

22 Claims, 4 Drawing Sheets

(56) References Cited

U.S. PATENT DOCUMENTS

| | | | | |
|---|---|---|---|---|
| 5,684,473 A | * | 11/1997 | Hibino et al. | 340/436 |
| 5,689,264 A | * | 11/1997 | Ishikawa et al. | 342/70 |
| 5,699,040 A | * | 12/1997 | Matsuda | 340/435 |
| 5,757,308 A | * | 5/1998 | Lissel et al. | 342/70 |
| 5,926,117 A | * | 7/1999 | Gunji et al. | 340/988 |
| 6,121,916 A | * | 9/2000 | McDade | 342/70 |
| 6,137,435 A | * | 10/2000 | Kai | 342/70 |
| 6,429,804 B1 | | 8/2002 | Kishida et al. | |
| 6,674,393 B2 | * | 1/2004 | Kishida | 342/70 |
| 6,691,018 B1 | * | 2/2004 | Miyahara | 701/301 |
| 6,753,804 B2 | * | 6/2004 | Miyahara | 342/70 |
| 6,924,762 B2 | * | 8/2005 | Miyake et al. | 342/70 |
| 7,053,817 B2 | * | 5/2006 | Nakano et al. | 342/90 |
| 7,119,734 B2 | * | 10/2006 | Nakano et al. | 342/70 |
| 7,532,109 B2 | * | 5/2009 | Takahama et al. | 340/436 |
| 7,570,198 B2 | * | 8/2009 | Tokoro | 342/70 |
| 7,667,636 B2 | * | 2/2010 | Kikuchi | 342/70 |
| 7,714,771 B2 | * | 5/2010 | Lehre et al. | 342/109 |
| 8,130,138 B2 | * | 3/2012 | Kikuchi | 342/70 |
| 2004/0246167 A1 | | 12/2004 | Kumon et al. | |
| 2008/0042894 A1 | | 2/2008 | Kikuchi | |
| 2009/0069952 A1 | | 3/2009 | Kikuchi | |
| 2012/0119937 A1 | | 5/2012 | Yamada et al. | |
| 2012/0229328 A1 | | 9/2012 | Aizawa | |

FOREIGN PATENT DOCUMENTS

| | | |
|---|---|---|
| JP | 2004 191131 | 7/2004 |
| JP | 2008 102591 | 5/2008 |
| JP | 2009 31053 | 2/2009 |
| JP | 2009 63439 | 3/2009 |
| JP | 2011 27695 | 2/2011 |
| WO | 2011 064823 | 6/2011 |

OTHER PUBLICATIONS

International Search Report Issued Sep. 21, 2010 in PCT/JP10/004015 Filed Jun. 16, 2010.

* cited by examiner

OBJECT IDENTIFICATION DEVICE AND METHOD

TECHNICAL FIELD

The present invention relates to an object identification device and a method for the same, and more particularly, to an object identification device provided in a mobile body such as an automobile, and a method for the same.

BACKGROUND ART

In recent years, mobile bodies such as an automobile have a radar device for measuring a relative distance, a relative velocity, and the like of an object around the mobile body, based on an electromagnetic wave radiated, and a reflected wave caused by the electromagnetic wave reflected from the object. Some of such radar devices provided in mobile bodies such as an automobile analyze the electromagnetic wave and the reflected wave, thereby recognizing whether an object around the mobile body is a three-dimensional object having a height that may cause an accident in which the vehicle collides with the object, or a road surface static object such as a manhole cover having a height that will not cause an accident in which the vehicle collides with the object, for example. As an example of such apparatuses, Patent Literature 1 discloses a front obstacle detection device (hereinafter, referred to as a conventional technique).

The conventional technique, for example, detects a preceding vehicle going ahead of the vehicle and an object in front of the vehicle, and if it has been determined that the preceding vehicle has travelled over the front object, recognizes the front object as a road surface static object as described above. In addition, if the preceding vehicle is present ahead of the front object, the conventional technique recognizes the front object as a road surface static object as described above. In addition, if the velocity of the vehicle is equal to or greater than a predetermined threshold value and if the front object is present between other two front objects that are continuously detected (for example, guard rails on the both sides of a road where the vehicle is travelling), the conventional technique recognizes the front object as a road surface static object. In addition, after the intensity of a reflected wave from the front object has monotonically increased in accordance with the distance to the front object relative to the vehicle, if it has been determined that the intensity monotonically decreases, the conventional technique recognizes the front object causing the reflected wave as a road surface static object.

CITATION LIST

Patent Literature

[PTL 1] Japanese Laid-Open Patent Publication No. 2009-31053

SUMMARY OF THE INVENTION

Problems to be Solved by the Invention

However, the conventional technique has the following problems. In the conventional technique, situations where such road surface static objects can be recognized are limited to certain cases such as the case where, as described above, a preceding vehicle travels over a front object, a preceding vehicle is present ahead of a front object, a front object is present between other two front objects that are continuously detected, or a reflected wave whose intensity has monotonically increased and then monotonically decreases is caused by a front object.

Therefore, an object of the present invention is to provide an object identification device and a method for the same that are capable of identifying a three-dimensional object and a road surface static object described above, irrespective of situations.

Solution to the Problems

The present invention has the following features to achieve the above object.

The first aspect of the present invention is an object identification device which identifies an object, based on a transmission signal and a reflection signal caused by the object reflecting the transmission signal. The object identification device includes: a measurement section configured to measure at least one of the relative distance and the relative velocity with respect to the object; an intensity detection section configured to detect the intensity of the reflection signal; and an object identification section configured to identify the object which can be an obstacle object, based on at least one of the relative velocity and the variation in the relative distance, and on the variation in the intensity. The object identification section includes an operation section configured to, if it is determined that the absolute value of the relative velocity of the object is equal to or smaller than a velocity threshold value, determine that the object is not a target to be identified as an obstacle object or a non-obstacle object, before the object is identified as an obstacle object or a non-obstacle object.

In a second aspect of the present invention based on the first aspect, the object identification section includes: a relative distance variation determination section configured to determine whether or not the variation in the relative distance is out of a predetermined range of variations in the relative distance; an intensity variation determination section configured to determine whether or not the variation in the intensity is out of a predetermined range of variations in the intensity; and an obstacle identification section configured to, if the variation in the relative distance is out of the predetermined range of variations in the relative distance, and the variation in the intensity is out of the predetermined range of variations in the intensity, identify the object as an obstacle object.

In a third aspect of the present invention based on the first aspect, the object identification section includes: a velocity determination section configured to determine whether or not the absolute value of the relative velocity is larger than a predetermined velocity threshold value; an intensity variation determination section configured to determine whether or not the variation in the intensity is out of a predetermined range of variations in the intensity; and an obstacle identification section configured to, if the absolute value of the relative velocity is larger than the predetermined velocity threshold value, and the variation in the intensity is out of the predetermined range of variations in the intensity, identify the object as an obstacle object.

In a fourth aspect of the present invention based on the first aspect, the object identification section includes: a relative distance variation determination section configured to determine whether or not the variation in the relative distance is out of a predetermined range of variations in the relative distance; a frequency determination section configured to determine whether or not the frequency that the variation in the intensity becomes out of a first predetermined range in a predetermined period is equal to or higher than a predetermined frequency threshold value; and an obstacle identification section configured to, if the variation in the relative distance is out of the predetermined range of variations in the relative distance, and the frequency is equal to or higher than the predetermined frequency threshold value, identify the object as an obstacle object.

In a fifth aspect of the present invention based on the first aspect, the object identification section includes: a velocity determination section configured to determine whether or not the absolute value of the relative velocity is larger than a predetermined velocity threshold value; a frequency determination section configured to determine whether or not the frequency that the variation in the intensity becomes out of a first predetermined range in a predetermined period is equal to or higher than a predetermined frequency threshold value; and an obstacle identification section configured to, if the absolute value of the relative velocity is larger than the predetermined velocity threshold value, and the frequency is equal to or higher than the predetermined frequency threshold value, identify the object as an obstacle object.

In a sixth aspect of the present invention based on the first aspect, if the variation in the relative distance is out of a predetermined range of variations in the relative distance, and the difference in frequencies calculated based on comparison between the variation in the intensity and each of predetermined ranges different from each other in a predetermined period is equal to or larger than a predetermined threshold value, the object identification section identifies the object as an obstacle object.

In a seventh aspect of the present invention based on the sixth aspect, the object identification section includes: a first counting section configured to count, as a first frequency, the number of times the variation in the intensity becomes out of a first predetermined range in a first predetermined period; a second counting section configured to count, as a second frequency, the number of times the variation in the intensity becomes out of a second predetermined range which is smaller than the first predetermined range in a second predetermined period; and a frequency difference calculation section configured to calculate, as the difference in frequencies, the difference between the first frequency and the second frequency.

In an eighth aspect of the present invention based on the sixth aspect, the object identification section includes: a first counting section configured to count, as a first frequency, the number of times the variation in the intensity becomes out of a first predetermined range in a first predetermined period; a second counting section configured to count, as a second frequency, the number of times the variation in the intensity becomes within a second predetermined range which is smaller than the first predetermined range in a second predetermined period; and a frequency difference calculation section configured to calculate, as the difference in frequencies, the difference between the first frequency and the second frequency.

In a ninth aspect of the present invention based on the sixth aspect, the object identification section includes: a first counting section configured to count, as a first frequency, the number of times the period from when the variation in the intensity becomes out of a first predetermined range to when the variation in the intensity becomes within the first predetermined range reaches a predetermined time length, in a first predetermined period; a second counting section configured to count, as a second frequency, the number of times the period from when the variation in the intensity becomes out of a second predetermined range which is smaller than the first predetermined range to when the variation in the intensity becomes within the second predetermined range reaches a predetermined time length, in a second predetermined period; and a frequency difference calculation section configured to calculate, as the difference in frequencies, the difference between the first frequency and the second frequency.

In a tenth aspect of the present invention based on the sixth aspect, the object identification section includes: a first counting section configured to count, as a first frequency, the number of times the period from when the variation in the intensity becomes out of a first predetermined range to when the variation in the intensity becomes within the first predetermined range reaches a predetermined time length, in a first predetermined period; a second counting section configured to count, as a second frequency, the number of times the period from when the variation in the intensity becomes within a second predetermined range which is smaller than the first predetermined range to when the variation in the intensity becomes out of the second predetermined range reaches a predetermined time length, in a second predetermined period; and a frequency difference calculation section configured to calculate, as the difference in frequencies, the difference between the first frequency and the second frequency.

In an eleventh aspect of the present invention based on the first aspect, if the relative velocity is larger than a predetermined velocity threshold value, and the difference in frequencies calculated based on comparison between the variation in the intensity and each of predetermined ranges different from each other in a predetermined period is equal to or larger than a predetermined threshold value, the object identification section identifies the object as an obstacle object.

In a twelfth aspect of the present invention based on the eleventh aspect, the object identification section includes: a first counting section configured to count, as a first frequency, the number of times the variation in the intensity becomes out of a first predetermined range in a first predetermined period; a second counting section configured to count, as a second frequency, the number of times the variation in the intensity becomes out of a second predetermined range which is smaller than the first predetermined range in a second predetermined period; and a frequency difference calculation section configured to calculate, as the difference in frequencies, the difference between the first frequency and the second frequency.

In a thirteenth aspect of the present invention based on the eleventh aspect, the object identification section includes: a first counting section configured to count, as a first frequency, the number of times the variation in the intensity becomes within a first predetermined range in a first predetermined period; a second counting section configured to count, as a second frequency, the number of times the variation in the intensity becomes out of a second predetermined range which is smaller than the first predetermined range in a second predetermined period; and a frequency difference calculation section configured to calculate, as the difference in frequencies, the difference between the first frequency and the second frequency.

In a fourteenth aspect of the present invention based on the eleventh aspect, the object identification section includes: a first counting section configured to count, as a first frequency, the number of times the period from when the variation in the intensity becomes out of a first predetermined range to when the variation in the intensity becomes within the first predetermined range reaches a predetermined time length, in a first predetermined period; a second counting section configured to count, as a second frequency, the number of times the period from when the variation in the intensity becomes out of a second predetermined range which is smaller than the first predetermined range to when the variation in the intensity becomes within the second predetermined range reaches a predetermined time length, in a second predetermined period; and a frequency difference calculation section configured to calculate, as the difference in frequencies, the difference between the first frequency and the second frequency.

In a fifteenth aspect of the present invention based on the eleventh aspect, the object identification section includes: a first counting section configured to count, as a first frequency, the number of times the period from when the variation in the intensity becomes out of a first predetermined range to when the variation in the intensity becomes within the first predetermined range reaches a predetermined time length, in a first predetermined period; a second counting section configured to count, as a second frequency, the number of times the period from when the variation in the intensity becomes within a second predetermined range which is smaller than the first predetermined range to when the variation in the intensity becomes out of the second predetermined range reaches a predetermined time length, in a second predetermined period; and a frequency difference calculation section configured to calculate, as the difference in frequencies, the difference between the first frequency and the second frequency.

In a sixteenth aspect of the present invention based on the first aspect, if the variation in the relative distance is out of a predetermined range of variations in the relative distance, and the ratio of the variation in the intensity to the variation in the relative distance is equal to or larger than a predetermined threshold value, the object identification section identifies the object as an obstacle object.

In a seventeenth aspect of the present invention based on the first aspect, if the variation in the relative distance is out of a predetermined range of variations in the relative distance, and the frequency that the ratio of the variation in the intensity to the variation in the relative distance becomes equal to or larger than a predetermined ratio threshold value in a predetermined period is equal to or higher than a predetermined frequency threshold value, the object identification section identifies the object as an obstacle object.

In an eighteenth aspect of the present invention based on the first aspect, if the variation in the relative distance is out of a predetermined range of variations in the relative distance, and the difference in frequencies calculated based on comparison between the ratio of the variation in the intensity to the variation in the relative distance and each of predetermined ratio threshold values different from each other in a predetermined period is equal to or larger than a predetermined frequency difference threshold value, the object identification section identifies the object as an obstacle object.

In a nineteenth aspect of the present invention based on the eighteenth aspect, the object identification section includes: a first counting section configured to count, as a first frequency, the number of times the ratio of the variation in the intensity to the variation in the relative distance becomes equal to or larger than a first predetermined ratio threshold value in a first predetermined period; a second counting section configured to count, as a second frequency, the number of times the ratio of the variation in the intensity to the variation in the relative distance becomes equal to or larger than a second predetermined ratio threshold value which is larger than the first predetermined ratio threshold value in a second predetermined period; and a frequency difference calculation section configured to calculate, as the difference in frequencies, the difference between the first frequency and the second frequency.

In a twentieth aspect of the present invention based on the first aspect, the object identification section includes: a stopping section configured to, if the relative distance to an object is out of a predetermined identification range, stop identification of the object as an obstacle or a non-obstacle object.

In a twenty-first aspect of the present invention based on the twentieth aspect, the object identification section further includes: an obstacle determination section configured to, if the relative distance to an object is out of the predetermined identification range, determine the object to be an obstacle object.

A twenty-second aspect of the present invention is an object identification method for identifying an object, based on a transmission signal and a reflection signal caused by the object reflecting the transmission signal. The object identification method includes: a measurement step of measuring at least one of the relative distance and the relative velocity with respect to the object; an intensity detection step of detecting the intensity of the reflection signal; and an object identification step of identifying the object which can be an obstacle object, based on at least one of the relative velocity and the variation in the relative distance, and on the variation in the intensity. The object identification step includes a step of, if it is determined that the absolute value of the relative velocity of the object is equal to or smaller than a velocity threshold value, determining that the object is not a target to be identified as an obstacle object or a non-obstacle object, before the object is identified as an obstacle object or a non-obstacle object.

Advantageous Effects of the Invention

According to the present invention, it becomes possible to provide an object identification device and a method for the same that are capable of identifying a three-dimensional object and a road surface static object described above, irrespective of situations.

Figure 1:
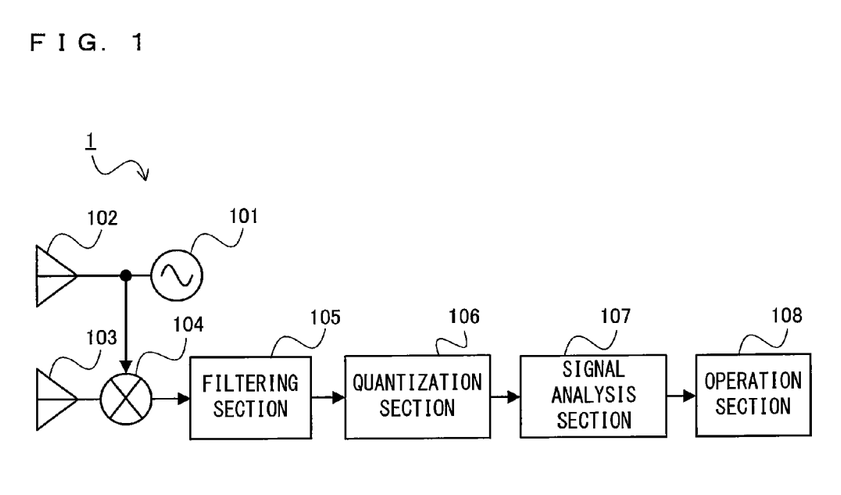
FIG. 1 is a block diagram showing the schematic configuration of an object identification device according to the present invention.

DESCRIPTION OF EMBODIMENTS (First Embodiment)
FIG. 1 is a block diagram showing the schematic configuration of an object identification device 1 according to the first embodiment of the present invention. The object identification device 1 of the present embodiment includes a transmission signal generation section 101, a transmission section 102, a reception section 103, a mixing section 104, a wave filtering section 105, a quantization section 106, a signal analysis section 107, and an operation section 108. In the present embodiment, it will be assumed that a vehicle has the object identification device 1.

The transmission signal generation section 101, typically, includes, as a main component, a VCO (Voltage Controlled Oscillator) which generates a signal having a frequency proportional to an applied voltage. The transmission signal generation section 101 generates, as a transmission signal, a so-called triangle wave whose frequency periodically varies such that the frequency gradually increases from a predetermined lower limit to a predetermined upper limit through a predetermined increscent period and then gradually decreases from the upper limit to the lower limit through a predetermined decrescent period.

The transmission section 102 is, typically, an antenna, and radiates the transmission signal generated by the transmission signal generation section 101, as an electromagnetic wave, to the space.

The reception section 103 is, typically, an antenna, and receives a reflection signal caused by an object reflecting the transmission signal radiated to the space by the transmission section 102.

The mixing section 104 is, typically, a mixer, and mixes the transmission signal generated by the transmission signal generation section 101 and the reflection signal received by the reception section 103, thereby generating a so-called beat signal whose frequency is equal to the difference between the frequencies of those signals.

The wave filtering section 105, typically, filters beat signals generated by the mixing section 104 so as to allow only a beat signal in a predetermined frequency band to pass.

The quantization section 106, typically, quantizes a beat signal that has passed through the wave filtering section 105 by a predetermined quantization frequency (sampling rate) and a predetermined quantization bit number, thereby converting the beat signal to a digital beat signal.

The signal analysis section 107 analyzes the digital beat signal generated by the quantization section 106 by FFT (Fast Fourier Transform), thereby generating spectrum information about a frequency spectrum which shows the intensity of each frequency component of the digital beat signal.

The operation section 108 acquires the spectrum information generated by the signal analysis section 107, and detects at least a relative velocity of each object causing a reflection signal received by the reception section 103, based on the peak value of the intensity in the frequency spectrum shown by the acquired spectrum information, and a frequency at which the intensity becomes the peak value. More specifically, in the frequency spectrum generated by the signal analysis section 107, the intensity becomes the peak value at a frequency corresponding to the velocity, relative to the vehicle, of each object causing the reflection signal.

The operation section 108 acquires the spectrum information about the frequency spectrum generated by the signal analysis section 107 analyzing the digital beat signal through the increscent period. Then, the operation section 108 detects the peak value of the intensity (hereinafter, referred to as an increscent peak intensity) and a frequency at which the intensity becomes the increscent peak intensity (hereinafter, referred to as an increscent peak frequency), from the frequency spectrum indicated by the acquired spectrum information. In addition, the operation section 108 acquires the spectrum information about the frequency spectrum generated by the signal analysis section 107 analyzing the digital beat signal through the decrescent period. Then, the operation section 108 detects the peak value of the intensity (hereinafter, referred to as a decrescent peak intensity) and a frequency at which the intensity becomes the decrescent peak intensity (hereinafter, referred to as a decrescent peak frequency), from the frequency spectrum indicated by the acquired spectrum information.

Next, by a known and so-called pairing process, the operation section 108 selects a combination of the increscent peak frequency and the decrescent peak frequency of a reflection signal caused by the same object, from the increscent peak frequencies and the decrescent peak frequencies that have been detected, and associates the combinations with the respective corresponding objects. Then, by a conventional known method, the operation section 108 detects the relative velocity of each object, based on the corresponding combination of the increscent peak frequency and the decrescent peak frequency selected by the pairing process, and associates the relative velocities with the respective objects.

Also, the operation section 108 associates the increscent peak intensity and the decrescent peak intensity corresponding to each combination of the increscent peak frequency and the decrescent peak frequency, with the corresponding object.

The operation section 108 of the present embodiment repeats the process of detecting the relative velocity of each object from the frequency spectrum and associating the relative velocities with the respective objects, every time the transmission signal generation section 101 generates one period of triangle wave. It is noted that the method for the operation section 108 of the present embodiment to calculate at least the relative velocity of each object based on the increscent peak frequency and the decrescent peak frequency is an FM-CW technique which is a conventional known technique.

In addition, by a conventional known tracking process, the operation section 108 of the present embodiment associates the relative velocity of each object detected in given one period of the generated triangle wave, and the relative velocity of each object detected in the next period of the generated triangle wave, with the same corresponding object, thereby continuously detecting the relative velocities of the respective objects.

In addition, while continuously detecting the relative velocity of each object, the operation section 108 of the present embodiment detects the increscent peak intensity and the decrescent peak intensity and associates them with each object as described above, every time one period of triangle wave is generated, thereby sequentially detecting the relative velocity, the increscent peak intensity, and the decrescent peak intensity with respect to each object.

After the operation section 108 detects the relative velocity, the increscent peak intensity, and the decrescent peak intensity and associates them with each object, the operation section 108 identifies each object as an obstacle object or a non-obstacle object, based on the associated relative velocity, increscent peak intensity, and decrescent peak intensity. Here, in the present embodiment, it will be assumed that an obstacle object is an object whose height from a road surface is such that the vehicle travelling on the road will collide with the object. In the present embodiment, examples of obstacle objects include a walking person, another vehicle, and the like. On the other hand, in the present embodiment, a non-obstacle object is an object whose height is such that the vehicle travelling on the road will not collide with the object. In the present embodiment, examples of non-obstacle objects include a laid iron sheet for work of construction, a manhole cover, and the like.

Before identifying an object as an obstacle object or a non-obstacle object, the operation section 108 of the present embodiment determines an object that is to be identified as an obstacle object or a non-obstacle object, from the objects for which the operation section 108 has detected the relative velocities. Specifically, if the absolute value of the relative velocity associated with an object is larger than a predetermined velocity threshold value thv, the operation section 108 determines that the object is a target to be identified as an obstacle object or a non-obstacle object. The reason why, if the absolute value of the relative velocity associated with an object is larger than the velocity threshold value thv, the operation section 108 determines that the object is a target to be identified as an obstacle object or a non-obstacle object, will be described later.

Next, the operation section 108 identifies the object determined to be a target that is to be identified as an obstacle object or a non-obstacle object. Specifically, the operation section 108 calculates a variation $\Delta P$ in intensity, associated with the object determined to be a target that is to be identified as an obstacle object or a non-obstacle object, and determines whether or not the absolute value of the variation $\Delta P$ is larger than a predetermined variation threshold value thp. Here, in the present embodiment, the variation $\Delta P$ in intensity associated with each object is obtained as follows. The average of the increscent peak intensity and the decrescent peak intensity associated with each object as described above is differentiated with respect to time, and the resultant value is associated with each object, as the variation $\Delta P$.

If the absolute value of the variation $\Delta P$ associated with an object is larger than the variation threshold value thp, the operation section 108 identifies the object as an obstacle object described above. On the other hand, if the absolute value of the variation $\Delta P$ associated with an object is equal to or smaller than the variation threshold value thp, the operation section 108 identifies the object as a non-obstacle object described above.

Figure 2A:
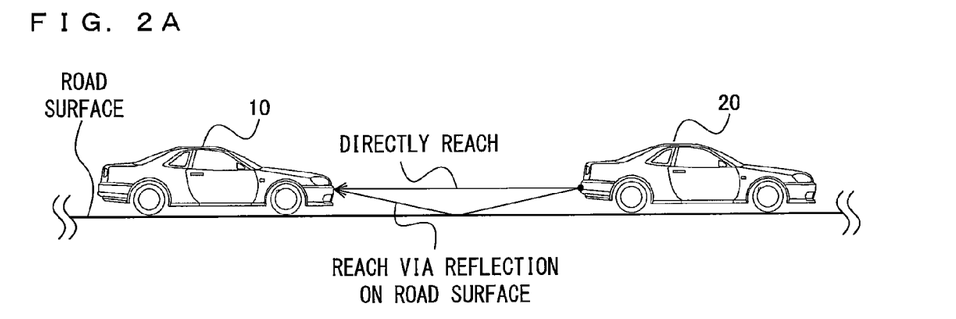
FIG. 2A shows examples of routes for a reflection signal from an obstacle object.

Here, the reason why, if the absolute value of the variation $\Delta P$ associated with an object is larger than the variation threshold value thp, the object can be identified as an obstacle object, will be described. FIG. 2A shows examples of routes through which, when a vehicle 10 and a preceding vehicle 20 are travelling, a reflection signal caused by the preceding vehicle 20 reflecting a transmission signal transmitted from the transmission section 102 of the vehicle 10 reaches the reception section 103 of the vehicle 10.

As indicated by the examples in FIG. 2A, routes through which a reflection signal caused by the preceding vehicle 20 reflecting a transmission signal transmitted from the transmission section 102 of the vehicle 10 reaches the reception section 103 of the vehicle 10, include at least two routes, i.e., the route through which a reflection signal reflected at a reflection point of the preceding vehicle 20 directly reaches the reception section 103 of the vehicle 10, and the route through which a reflection signal reflected at a reflection point of the preceding vehicle 20 is further reflected by a road and then reaches the reception section 103 of the vehicle 10. Hereinafter, if a reflection signal reflected at a reflection point of the preceding vehicle 20 directly reaches the reception section 103 of the vehicle 10, the reflection signal is referred to as a direct reflection signal, and if a reflection signal reflected at a reflection point of the preceding vehicle 20 is further reflected by a road and then reaches the reception section 103 of the vehicle 10, the reflection signal is referred to as a road reflection signal.

Here, the route through which a direct reflection signal reaches the reception section 103 of the vehicle 10, and the route through which a road reflection signal reaches the reception section 103 of the vehicle 10 are different in their lengths. Therefore, there is a phase difference between the direct reflection signal and the road reflection signal received by the reception section 103 of the vehicle 10. The phase difference between the direct reflection signal and the road reflection signal received by the reception section 103 of the vehicle 10 varies in accordance with the variation in the relative distance between the vehicle 10 and the preceding vehicle 20. Here, the direct reflection signal and the road reflection signal are received in a superimposed state by the reception section 103 of the vehicle 10. Therefore, if the phase difference between the direct reflection signal and the road reflection signal varies in accordance with the variation in the relative distance between the vehicle 10 and the preceding vehicle 20, the intensity of a reflected wave composed of those two signals in a superimposed state (hereinafter, referred to as a composite reflection signal) varies.

Figure 2B:
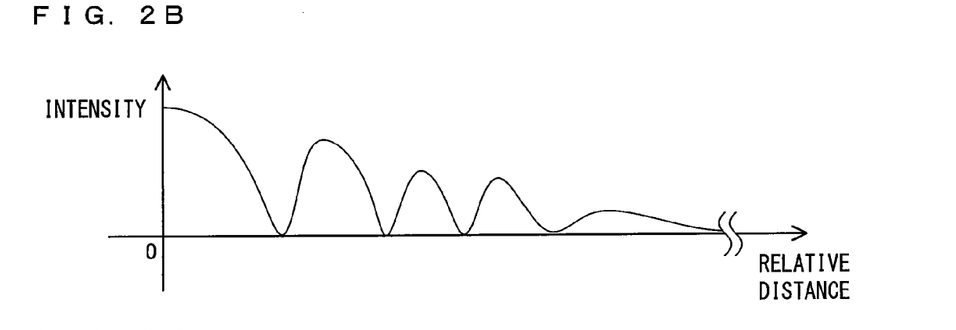
FIG. 2B shows an example of the intensity of a composite reflection signal.
Figure 2C:
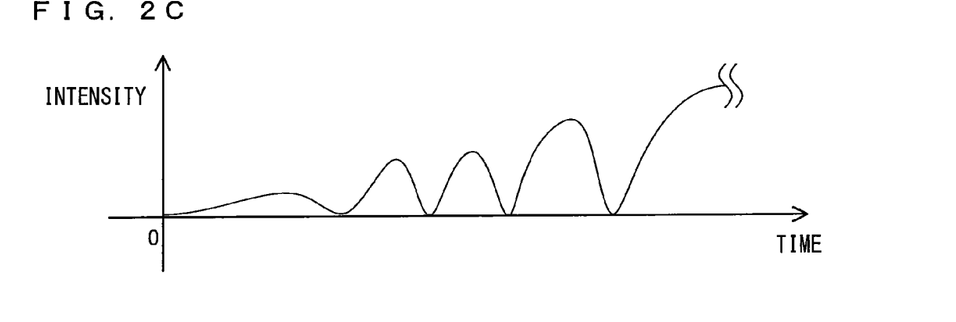
FIG. 2C shows an example of the intensity of a composite reflection signal.

FIG. 2B shows an example of the correspondence relationship between the varying intensity of a composite reflection signal and the relative distance between the vehicle 10 and the preceding vehicle 20. In the example of FIG. 2B, the intensity attenuates as the relative distance increases. FIG. 2C shows an example of the correspondence relationship between the varying intensity of a composite reflection signal and the elapsed time, in the case where the vehicle 10 is coming close to the preceding vehicle 20 so that the relative distance between the vehicle 10 and the preceding vehicle 20 varies. In the example of FIG. 2C, as the vehicle 10 comes close to the preceding vehicle 20 with time, the distance the composite reflection signal propagates in the space to attenuate decreases, and the intensity increases.

As shown in FIG. 2B and FIG. 2C, while the relative distance between the vehicle 10 and the preceding vehicle 20 varies with time and the phase difference between a direct reflection signal and a road reflection signal varies, constructive interference and destructive interference are periodically repeated, whereby the intensity of a composite reflection signal composed of the direct reflection signal and the road reflection signal periodically varies.

That is, as shown in FIG. 2A, if the transmission section 102 transmits a transmission signal to an object such as the preceding vehicle 20 that can be considered to be an obstacle object (three-dimensional object) whose height from a road surface is such that the travelling vehicle 10 will collide with the object, a composite reflection signal whose intensity periodically varies is received.

Then, as described above, the operation section 108 of the present embodiment compares the absolute value of the variation $\Delta P$ with the variation threshold value thp. If the intensity periodically varies and the absolute value is larger than the variation threshold value thp, the operation section 108 identifies the corresponding object associated with the variation $\Delta P$, as an obstacle object.

However, for example, in the case where the relative velocity of the preceding vehicle 20 with respect to the vehicle 10 is substantially zero, the relative distance therebetween does not vary and therefore the phase difference between the direct reflection signal and the road reflection signal received in a superimposed state by the reception section 103 of the vehicle 10 does not vary. Therefore, when the relative velocity of the preceding vehicle 20 with respect to the vehicle 10 is substantially zero, the intensity of a composite reflection signal composed of the direct reflection signal and the road reflection signal does not vary as described above, and the absolute value of the variation $\Delta P$ does not exceed the variation threshold value thp. Then, if the absolute value of the variation $\Delta P$ in intensity does not exceed the variation threshold value thp, as described above, the operation section 108 of the present embodiment erroneously identifies the corresponding object associated with the variation ΔP, as a non-obstacle object, even if the object is an obstacle such as the preceding vehicle 20.

That is, in the case where the operation section 108 identifies, as an obstacle object or a non-obstacle object, an object whose relative velocity with respect to the vehicle 10 is substantially zero, if the operation section 108 only compares the absolute value of the variation ΔP with the variation threshold value thp as described above, the operation section 108 can erroneously identify an object that is actually an obstacle, as a non-obstacle object.

Therefore, in order to avoid erroneously identifying an obstacle object as a non-obstacle object, as described above, the operation section 108 of the present embodiment determines an object that is to be identified as an obstacle object or a non-obstacle object, before the identification process. Since an obstacle object whose relative velocity is substantially zero can be erroneously identified as a non-obstacle object as described above, specifically, if the absolute value of the relative velocity associated with an object is larger than the predetermined velocity threshold value thy as described above, the operation section 108 of the present embodiment determines that the object is a target to be identified as an obstacle object or a non-obstacle object. The above is the reason why, if the absolute value of the relative velocity associated with an object is larger than the velocity threshold value thv, the operation section 108 of the present embodiment determines that the object is a target to be identified as an obstacle object or a non-obstacle object.

Figure 3A:
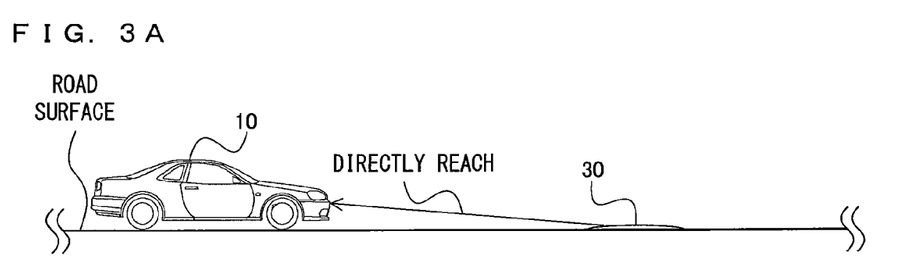
FIG. 3A shows examples of routes for a reflection signal from a non-obstacle object.

Next, the reason why, if the absolute value of the variation ΔP in intensity associated with an object is equal to or smaller than the variation threshold value thp, the object can be identified as a non-obstacle object, will be described. FIG. 3A shows an example of a route through which, when the vehicle 10 is travelling, a reflection signal caused by a manhole cover 30 which is present on a road in front of the vehicle 10 and has reflected a transmission signal transmitted by the transmission section 102 of the vehicle 10 reaches the reception section 103 of the vehicle 10.

As shown in FIG. 3A, when a reflection signal caused by the manhole cover 30 reflecting a transmission signal transmitted by the transmission section 102 of the vehicle 10 reaches the reception section 103 of the vehicle 10, there is only one route through which the reflection signal reflected at the reflection point of the manhole cover 30 directly reaches the reception section 103 of the vehicle 10.

In the case where there is only one route through which a reflection signal reaches the reception section 103 of the vehicle 10, such a composite reflection signal whose intensity periodically varies in accordance with the variation in the relative distance is not received by the reception section 103 of the vehicle 10, unlike the case where there are at least two routes as described with reference to FIG. 2A.

Figure 3B:
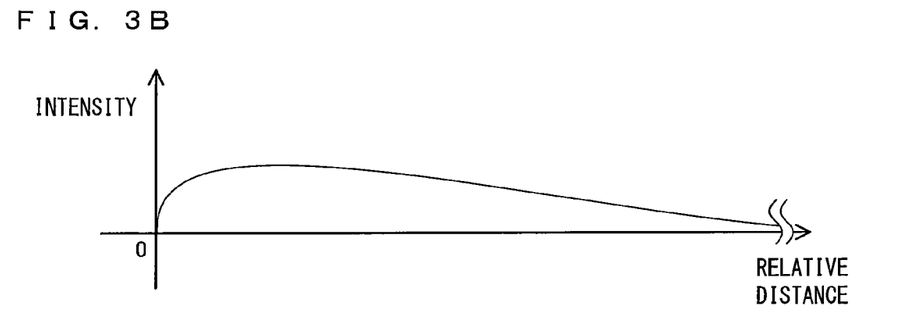
FIG. 3B shows an example of the intensity of a reflection signal.
Figure 3C:
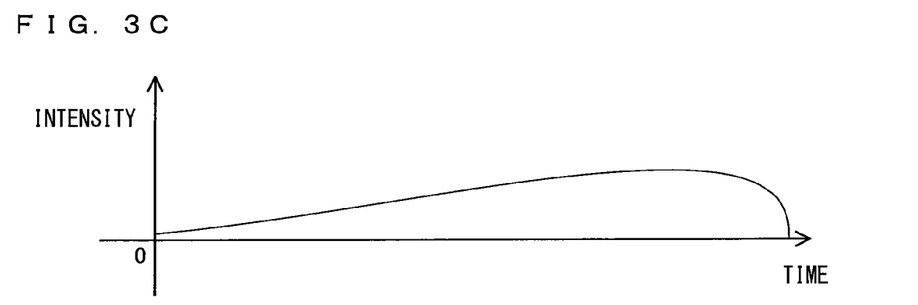
FIG. 3C shows an example of the intensity of a reflection signal.

FIG. 3B shows an example of the correspondence relationship between the intensity of a reflection wave caused by the manhole cover 30 reflecting a transmission signal transmitted from the transmission section 102 of the vehicle 10 as shown in FIG. 3A, and the relative distance between the vehicle 10 and the manhole cover 30. As shown in FIG. 3B, as the relative distance between the vehicle 10 and the manhole cover 30 increases, the distance the reflection signal propagates in the space increases, and the intensity attenuates. FIG. 3C shows an example of the correspondence relationship between the elapsed time and the intensity of a reflection signal caused by the manhole cover 30 reflecting a transmission signal transmitted from the transmission section 102 of the vehicle 10 as shown in FIG. 3A, in the case where the vehicle 10 is coming close to the manhole cover 30. As shown in FIG. 3C, as the vehicle 10 comes close to the manhole cover 30 with time, the distance the reflection signal propagates in the space to attenuate decreases, and the intensity increases.

In the case where a transmission signal transmitted from the transmission section 102 of the vehicle 10 is reflected by the manhole cover 30, if there is only one route through which the reflection signal reaches the reception section 103 of the vehicle 10, i.e., if only the reflection signal reflected at the reflection point of the manhole cover 30 is received by the reception section 103 of the vehicle 10, the intensity of the reflection signal relatively monotonically and gradually varies with time as the relative distance between the vehicle 10 and the manhole cover 30 varies, as shown in FIG. 3B and FIG. 3C.

That is, as shown in FIG. 3A, in the case where the transmission section 102 transmits a transmission signal to an object such as the manhole cover 30 that can be considered to be a non-obstacle object (road surface static object) whose height from a road surface is such that the travelling vehicle 10 will not collide with the object, a reflection signal whose intensity relatively monotonically varies is received. Therefore, as described above, the operation section 108 of the present embodiment compares the absolute value of the variation ΔP with the variation threshold value thp. Then, if the intensity relatively monotonically and gradually varies and therefore the absolute value is equal to or smaller than the variation threshold value thp, the operation section 108 identifies the corresponding object associated with the variation ΔP, as a non-obstacle object.

Thus, the operation section 108 of the present embodiment can identify an object as an obstacle object or a non-obstacle object, based on the relative velocity of the object and the intensity of a reflection signal.

Next, with reference to a flowchart shown in FIG. 4, the flow of a process executed by the operation section 108 of the present embodiment will be described. As an example, it will be assumed that when an accessory switch or an ignition switch of the vehicle 10 has been turned on, the operation section 108 of the present embodiment starts the process of the flowchart in FIG. 4 with the other units of the object identification device 1 starting to operate, and when the accessory switch or the ignition switch has been turned off, the operation section 108 ends the process of the flowchart in FIG. 4. In addition, in the flowchart in FIG. 4, it will be assumed that n objects are detected. The relative velocity V and the variation ΔP of the i-th object (i=1 to n) are denoted as a relative velocity $V_i$ and a variation $\Delta P_i$, respectively, by using an index "i".

In step S101, the operation section 108 acquires spectrum information indicating a frequency spectrum obtained by the signal analysis section 107 analyzing a digital beat signal through the increscent period, and spectrum information indicating a frequency spectrum obtained by the signal analysis section 107 analyzing a digital beat signal through the decrescent period. If the operation section 108 has completed the processing of step S101, the process proceeds to step S102.

In step S102, the operation section 108 detects the relative velocity $V_i$ of each object, based on the spectrum information acquired in step S101, as described above. If the operation section 108 has completed the processing of step S102, the process proceeds to step S103.

In step S103, the operation section 108 calculates the variation ΔP; in intensity with respect to each object, based on the spectrum information acquired in step S101, as described above. If the operation section 108 has completed the processing of step S103, the process proceeds to step S104.

In step S104, the operation section 108 initializes the variable i used for identifying the relative velocity V and the variation ΔP of each object, to 1. If the operation section 108 has completed the processing of step S104, the process proceeds to step S105.

In step S105, the operation section 108 determines whether or not the i-th object is a target to be identified as an obstacle object or a non-obstacle object. Specifically, as described above, the operation section 108 determines whether or not the absolute value of the relative velocity $V_i$ of the i-th object is larger than the predetermined velocity threshold value thv. If the operation section 108 has determined that the absolute value of the relative velocity $V_i$ of the i-th object is larger than the velocity threshold value thv, the operation section 108 determines that the i-th object is a target to be identified as an obstacle object or a non-obstacle object in subsequent step S106, and the process proceeds to the step S106. On the other hand, if the operation section 108 has determined that the absolute value of the relative velocity $V_i$ of the i-th object is equal to or smaller than the velocity threshold value thv, the operation section 108 determines that the i-th object is not a target to be identified as an obstacle object or a non-obstacle object, and the process proceeds to step S109.

In step S106, the operation section 108 identifies, as an obstacle object or a non-obstacle object, the i-th object which has been determined to be a target to be identified as an obstacle object or a non-obstacle object in step S105. Specifically, as described above, the operation section 108 determines whether or not the absolute value of the variation $ΔP_i$ in intensity for the i-th object is larger than the variation threshold value thp. If, in step S106, the operation section 108 has determined that the absolute value of the variation $ΔP_i$ in intensity for the i-th object is larger than the variation threshold value thp, the i-th object is determined to be an obstacle object and the process proceeds to step S107. On the other hand, if, in step S106, the operation section 108 has determined that the absolute value of the variation $ΔP_i$ in intensity for the i-th object is equal to or smaller than the variation threshold value thp, the i-th object is determined to be a not-obstacle object and the process proceeds to step S108.

In step S107, the operation section 108 turns on an obstacle flag for the i-th object which is stored in a storage section not shown, so as to indicate that the i-th object identified as an obstacle object in step S106 is an obstacle. If the operation section 108 has completed the processing of step S107, the process proceeds to step S110. It is noted that in step S107, the operation section 108 turns off the other flags for the i-th object for which the obstacle flag is turned on.

In step S108, the operation section 108 turns off the obstacle flag for the i-th object which is stored in the storage section not shown, so as to indicate that the i-th object identified as a non-obstacle object in step S106 is a non-obstacle object. If the operation section 108 has completed the processing of step S108, the process proceeds to step S110. It is noted that in step S108, the operation section 108 also turns off the other flags that are on, for the i-th object for which the obstacle flag is turned off.

In step S109, the operation section 108 turns on an identification suspended flag so as to indicate suspending identification of the i-th object which, in step S105, has been determined not to be a target that is to be immediately identified as an obstacle object or a non-obstacle object. It is noted that in step S109, the operation section 108 turns off the other flags that are on, for the i-th object for which the identification suspended flag is turned on. In addition, the reason why the operation section 108 turns on the identification suspended flag in step S109 is because the relative velocity $V_i$ of the i-th object in this case is equal to or smaller than the velocity threshold value thv, that is, the relative velocity $V_i$ is substantially zero. It is considered that such an object cannot collide with the vehicle and it is not necessary to immediately identify the object as an obstacle object or a non-obstacle object.

In step S110, the operation section 108 determines whether or not the variable i is larger than the aforementioned number n, in order to determine whether or not the detected n objects have been identified. If, in step S109, the operation section 108 has determined that the variable i is larger than n, it is determined that all the n objects have been identified, and the process returns to step S101. On the other hand, if, in step S109, the operation section 108 has determined that the variable i is equal to or smaller than n, it is determined that not all the n objects have been identified, and the process proceeds to step S111.

In step S111, the operation section 108 increments the variable i by 1, in order to identify, of the n objects, the next object that has not been identified as an obstacle object or a non-obstacle object yet. If the operation section 108 has completed the processing of step S111, the process returns to step S105, and the operation section 108 determines whether or not the next object is a target to be identified as an obstacle object or a non-obstacle object.

The object identification device 1 of the present embodiment is as described thus far. As described above, in the object identification device 1 of the present embodiment, when the operation section 108 has determined an object to be a target to be identified as an obstacle object or a non-obstacle object, if the variation ΔP in the periodically varying intensity is associated with the object, the operation section 108 identifies the object as an obstacle object, and if the variation ΔP in the periodically varying intensity is not associated with the object, the operation section 108 identifies the object as a non-obstacle object.

Therefore, according to the object identification device 1 of the present embodiment, situations where a non-obstacle object such as a road surface static object can be identified are not limited to certain cases, such as the case where a preceding vehicle travels over a front object or a preceding vehicle is present ahead of a front object. That is, it is possible to identify an object present in front of the vehicle as an obstacle object or a non-obstacle object, irrespective of situations.

In the first embodiment, by using a combination of the increscent peak frequency and the decrescent peak frequency obtained by pairing processing, the operation section 108 detects at least the relative velocity of the corresponding object. However, in another embodiment, by using a combination of the increscent peak frequency and the decrescent peak frequency obtained by pairing processing, the operation section 108 may further detect the relative distance to the corresponding object, and may use the variation in the relative distance for determination of an object that is to be indentified as an obstacle object or a non-obstacle object. Also a method for detecting the relative distance to an object based on the increscent peak frequency and the decrescent peak frequency may use an FM-CW method which is a conventional known technique described above. In this case, as in the relative velocity, the operation section 108 can continuously detect the relative distance with respect to each object, by a conventional known tracking process as described above.

In the case where an object that is to be identified as an obstacle object or a non-obstacle object is determined by using the variation in the relative distance, if the variation in the relative distance is out of a predetermined range, the operation section 108 determines that the object is a target to be identified as an obstacle object or a non-obstacle object, and if the variation in the relative distance is not out of a predetermined range, the operation section 108 determines that the object is not a target to be identified as an obstacle object or a non-obstacle object. This is because an obstacle object is erroneously identified as a non-obstacle object if the relative velocity of the obstacle object with respect to the vehicle is substantially zero so that the relative distance does not vary, that is, if the variation in the relative distance is not out of the predetermined range, as described in the first embodiment. The variation in the relative distance may be a value, obtained by differentiating the relative distance with respect to time, which is associated with each object, or may be the difference between the maximum value and the minimum value of the relative distance in a predetermined period.

In the case where an object that is to be identified as an obstacle object or a non-obstacle object is determined by using the variation in the relative distance, the operation section 108 may compare the absolute value of the variation in the relative distance with a predetermined distance threshold value. If the absolute value of the variation in the relative distance to an object is larger than the predetermined distance threshold value, the operation section 108 may determine that the object is a target to be identified as an obstacle object or a non-obstacle object, and if the absolute value of the variation in the relative distance to an object is equal to or smaller than the predetermined distance threshold value, the operation section 108 may determine that the object is not a target to be identified as an obstacle object or a non-obstacle object.

Figure 4:
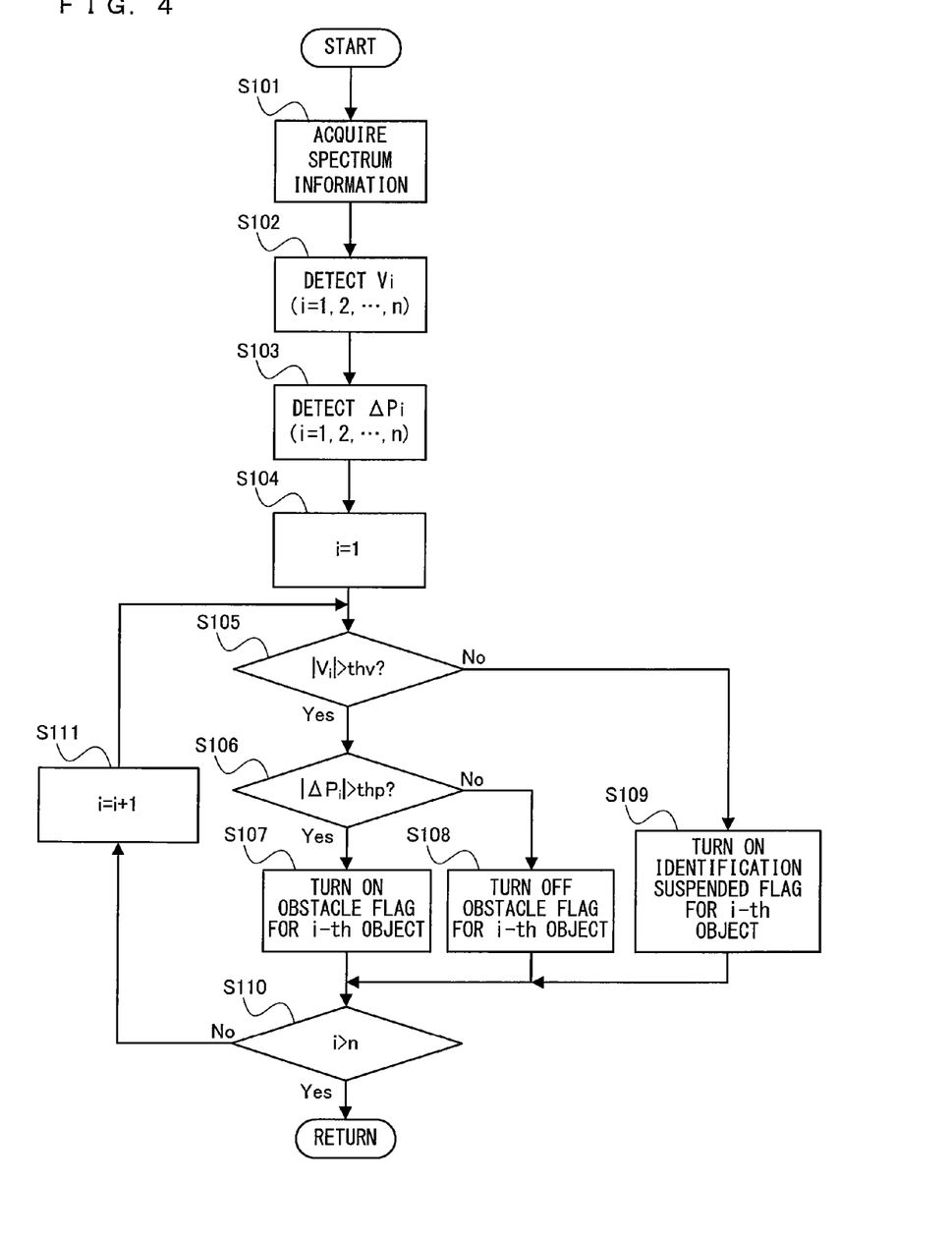
FIG. 4 is a flowchart showing an example of a process performed by an operation section according to the present invention.

In the case where the operation section 108 also detects the relative distance, the following process may be performed though not shown in the flowchart in FIG. 4. With respect to all objects, after the operation section 108 has determined whether or not each object is a target to be identified as an obstacle object or a non-obstacle object, and has identified the target objects as an obstacle object or a non-obstacle object, the operation section 108 may generate identification information indicating the relative distance and the relative velocity detected for each object and discrimination between obstacle and non-obstacle with respect to each object. The generated identification information may be acquired by, for example, an alert device which, if collision tolerance period becomes smaller than a predetermined time threshold value, determines that collision can occur and alerts a driver, or by a control device which, in such a case, tightens the seatbelt fastening a driver to prepare for collision. Thus, such a device can determine the possibility of collision with respect to only objects that have been identified as obstacle objects, whereby unnecessary processing can be omitted. Here, the collision tolerance period is a time taken to travel the relative distance between the vehicle 10 and given another vehicle such as a preceding vehicle, a following vehicle, or an oncoming vehicle, at the relative velocity with respect to the other vehicle until collision with the other vehicle. The collision tolerance period is calculated by dividing the relative distance between the vehicle 10 and the other vehicle by the relative velocity of the other vehicle with respect to the vehicle 10. It is noted that the collision tolerance period is also called a TTC (Time To Collision).

In the case where the operation section 108 also detects the relative distance, the operation section 108 may determine an object that is to be determined as an obstacle object or a non-obstacle object, by using the relative velocity and the relative distance. Specifically, if the absolute value of the relative velocity of an object is larger than the velocity threshold value thy and the variation in the relative distance to the object is out of a predetermined range, the operation section 108 may determine that the object is a target to be determined as an obstacle object or a non-obstacle object.

In the first embodiment, in order to determine an object that is to be determined as an obstacle object or a non-obstacle object, the operation section 108 determines whether or not the absolute value of the relative velocity detected for each object is larger than the velocity threshold value thv. However, in another embodiment, in order to determine an object that is to be determined as an obstacle object or a non-obstacle object, the operation section 108 may determine whether or not the relative velocity detected for each object is out of a predetermined range. In this case, the operation section 108 determines that an object whose relative velocity is out of the predetermined range is a target to be identified as an obstacle object or a non-obstacle object. On the other hand, the operation section 108 determines that an object whose relative velocity is not out of the predetermined range is not a target to be identified as an obstacle object or a non-obstacle object. This is because an obstacle object is erroneously identified as a non-obstacle object if the relative velocity of the obstacle object with respect to the vehicle is substantially zero, that is, if the variation in the relative distance is not out of the predetermined range, as described in the first embodiment.

In the first embodiment, in order to identify an object as an obstacle object or a non-obstacle object, the operation section 108 determines whether or not the absolute value of the variation ΔP in intensity associated with each object is larger than the variation threshold value thp. However, in another embodiment, in order to identify an object as an obstacle object or a non-obstacle object, the operation section 108 may determine whether or not the variation ΔP in intensity associated with each object is out of a predetermined range. In this case, the operation section 108 identifies an object associated with the variation ΔP in intensity that is out of the predetermined range, as an obstacle object. On the other hand, the operation section 108 identifies an object associated with the variation ΔP in intensity that is not out of the predetermined range, as a non-obstacle object. This is because, if a transmission signal is transmitted to an object considered to be an obstacle object whose height from a road surface is such that the travelling vehicle will collide with the object, a composite reflection signal whose intensity periodically varies to cause the variation ΔP to be out of the predetermined range, is received, as described in the first embodiment.

In another embodiment, in order to identify an object as an obstacle object or a non-obstacle object, the operation section 108 may determine whether or not the frequency that the variation ΔP in intensity associated with each object becomes out of a predetermined range in a predetermined frequency determination period is equal to or higher than a predetermined frequency threshold value. In this case, if the frequency that the variation ΔP in intensity for an object becomes out of the predetermined range is equal to or higher than the predetermined frequency threshold value, the operation section 108 identifies the object as an obstacle object, and if the frequency that the variation ΔP in intensity for an object becomes out of the predetermined range is lower than the predetermined frequency threshold value, the operation section 108 identifies the object as a non-obstacle object. This is because it is considered that, if a transmission signal is transmitted to an object considered to be an obstacle object, a composite reflection signal whose intensity periodically varies to cause the variation ΔP to be out of the predetermined range at a frequency equal to or larger than the frequency threshold value in the frequency determination period, is received, as described in the first embodiment.

In another embodiment, in order to identify an object as an obstacle object or a non-obstacle object, the following method may be employed. If the difference in frequencies calculated based on comparison between predetermined ranges different from each other in a predetermined period is equal to or larger than a predetermined threshold value, the operation section 108 may identify the corresponding object associated with the variation ΔP in intensity, as an obstacle object. More specifically, in order to identify an object as an obstacle object or a non-obstacle object, the operation section 108 may count, as a first frequency, the number of times the variation ΔP in intensity associated with each object becomes out of a first predetermined range in a first predetermined frequency determination period, and may count, as a second frequency, the number of times the variation ΔP in intensity becomes out of a second predetermined range which is smaller than the first range, in a second predetermined frequency determination period. In this case, if the frequency difference obtained by subtracting the second frequency from the first frequency is equal to or larger than a predetermined frequency difference threshold value, the operation section 108 identifies an object associated with the variation ΔP in intensity causing that frequency difference, as an obstacle object. On the other hand, if the frequency difference obtained by subtracting the second frequency from the first frequency is smaller than the predetermined frequency difference threshold value, the operation section 108 identifies an object associated with the variation ΔP in intensity causing that frequency difference, as a non-obstacle object.

In the case where the operation section 108 counts the first frequency and the second frequency as described above, the operation section 108 may count, as the second frequency, the number of times the variation ΔP in intensity associated with each object becomes within the second predetermined range which is smaller than the first range, in the second frequency determination period. Also in this case, the first frequency for the variation ΔP in intensity associated with an object considered to be an obstacle object becomes out of the first range, the second frequency becomes within the second frequency, and the frequency difference between the first frequency and the second frequency calculated for the variation ΔP in intensity associated with the object considered to be an obstacle object becomes large. Therefore, the difference value becomes equal to or larger than the frequency difference threshold value, and the operation section 108 identifies the object, as an obstacle object.

In the case where the operation section 108 counts the first frequency and the second frequency as described above, the operation section 108 may count, as the first frequency, the number of times the period from when the variation ΔP in intensity becomes out of the first range to when the variation ΔP in intensity becomes within the first range reaches a predetermined time length (for example, a sampling time), in the first frequency determination period. In addition, the operation section 108 may count, as the second frequency, the number of times the period from when the variation ΔP in intensity becomes out of the second range to when the variation ΔP in intensity becomes within the second range reaches the predetermined time length, in the second frequency determination period. Also in this case, the first frequency for the variation ΔP in intensity associated with an object considered to be an obstacle object is high, and the second frequency for the variation ΔP is low. Therefore, the frequency difference between the first frequency and the second frequency calculated for the variation ΔP in intensity associated with an object considered to be an obstacle object becomes equal to or larger than the frequency difference threshold value, and the operation section 108 identifies the object as an obstacle object.

In the case where the operation section 108 counts the first frequency and the second frequency as described above, the operation section 108 may count, as the first frequency, the number of times the period from when the variation ΔP in intensity becomes out of the first range to when the variation ΔP in intensity becomes within the first range reaches a predetermined time length (for example, a sampling time), in the first frequency determination period. In addition, the operation section 108 may count, as the second frequency, the number of times the period from when the variation ΔP in intensity becomes within the second range to when the variation ΔP in intensity becomes out of the second range reaches the predetermined time length, in the second frequency determination period. Also in this case, the first frequency for the variation ΔP in intensity associated with an object considered to be an obstacle object is high, and the second frequency for the variation ΔP is low. Therefore, the frequency difference between the first frequency and the second frequency calculated for the variation ΔP in intensity associated with an object considered to be an obstacle object becomes equal to or larger than the frequency difference threshold value, and the operation section 108 identifies the object as an obstacle object.

In another embodiment, in order to identify an object as an obstacle object or a non-obstacle object, the operation section 108 may determine whether or not the ratio of the variation in the relative distance at a certain point of time and the variation ΔP in intensity at the same point of time is equal to or larger than a predetermined ratio threshold value. In this case, if the ratio of the variation in the relative distance at a certain point of time and the variation ΔP in intensity at the same point of time is equal to or larger than the predetermined ratio threshold value, the operation section 108 identifies the corresponding object associated with the variation ΔP in intensity, as an obstacle object. On the other hand, if the ratio of the variation in the relative distance at a certain point of time and the variation ΔP in intensity at the same point of time is smaller than the predetermined ratio threshold value, the operation section 108 identifies the corresponding object associated with the variation ΔP in intensity, as a non-obstacle object.

In another embodiment, in order to identify an object as an obstacle object or a non-obstacle object, the following method may be employed. If the difference in frequencies calculated based on comparison between the ratio of the variation ΔP in intensity to the variation in the relative distance and each of predetermined ratio threshold values different from each other in a predetermined period is equal to or larger than a predetermined frequency difference threshold value, the operation section 108 may identify the corresponding object associated with the variation ΔP in intensity, as an obstacle object. More specifically, in order to identify an object as an obstacle object or a non-obstacle object, the operation section 108 may count, as a first frequency, the number of times the ratio of the variation ΔP in intensity to the variation in the relative distance at a certain point of time becomes equal to or larger than a first predetermined ratio threshold value in a first predetermined period, and may count, as a second frequency, the number of times the ratio of the variation ΔP in intensity to the variation in the relative distance becomes equal to or larger than a second predetermined ratio threshold value which is smaller than the first ratio threshold value, in a second predetermined period. Then, the operation section 108 may determine whether or not the frequency difference obtained by subtracting the frequency from the first frequency is equal to or larger than a predetermined frequency difference threshold value. In this case, if the frequency difference is equal to or larger than the predetermined frequency difference threshold value, the operation section 108 identifies, as an obstacle object, an object associated with the variation ΔP in intensity causing the first frequency and the second frequency corresponding to the frequency difference. On the other hand, if the frequency difference is smaller than the predetermined frequency difference threshold value, the operation section 108 identifies, as a non-obstacle object, an object associated with the variation ΔP in intensity causing the first frequency and the second frequency corresponding to the frequency difference.

In another embodiment, if the relative distance to an object is out of a predetermined range, the operation section 108 may stop the identification for the object, i.e., may determine that the object is not a target to be identified as an obstacle object or a non-obstacle object. The reason is as follows. In such a device that measures the relative velocity or the relative distance for an object based on a transmission signal and a reflection signal as described in the first embodiment, the reception range for a reflection signal with respect to the vertical direction is limited. Therefore, the device cannot receive a road reflection signal from an object present at an excessively close distance from the vehicle. In addition, if a composite reflection signal is received from an object present at a distance excessively far from the vehicle, it is difficult to accurately determine whether or not the variation ΔP in intensity is due to some error. That is, if an object is present at a distance excessively close to or excessively far from the vehicle, there is a possibility that the object is erroneously determined as an obstacle object or a non-obstacle object. Accordingly, if an object is present at a relative distance that is out of the above predetermined range and causes the possibility of erroneous determination such as a relative distance excessively close to or excessively far from the vehicle, the operation section 108 determines that the object is not a target to be identified as an obstacle object or a non-obstacle object, thereby excluding the possibility of erroneous determination. In addition, in this case, the operation section 108 may determine all objects that are present at such distance out of the predetermined range, to be obstacle objects, without performing identification processing. As a result, all objects that cannot be accurately identified as an obstacle object or a non-obstacle object are determined to be obstacle objects, whereby identification information as described above is generated. Thus, an alert device or a control device as described above can consider all objects that can be erroneously determined, to be obstacle objects, and can consider the possibility of collision for such objects, thereby ensuring increased safety.

In the first embodiment, the operation section 108 uses, as the variation ΔP in intensity associated with each object, a value obtained by differentiating the average of the increscent peak intensity and the decrescent peak intensity associated with each object, with respect to time. However, in another embodiment, the operation section 108 may use, as the variation ΔP in intensity associated with each object, one of the increscent peak intensity and the decrescent peak intensity, a value obtained by differentiating one of them with respect to time, or the like.

In another embodiment, instead of each value such as the relative distance, the relative velocity, the intensity, and the variation ΔP in intensity for each object, the operation section 108 may use the average of the value in a predetermined averaging period.

In the first embodiment, the object identification device 1 has one reception section 103. However, in another embodiment, an object identification device having one or more reception sections may be used. In this case, the variation ΔP in intensity associated with each object may be calculated by using the average of the intensities of beat signals generated by mixing transmission signals with respective reflection signals received by the one or more reception sections.

In such an object identification device having one or more reception sections, in the case where these reception sections are provided being arranged along the horizontal direction and the object identification device can detect the azimuth angle at which an object is present by using a conventional known technique based on the phase difference between reflection signals received by these reception sections, the object identification device may synthesize beams for each predetermined range of azimuth angles (digital beam forming), use the synthesized signal of the beams for each range, as a reflection signal for the direction corresponding to the range, and identify an object present in each range of azimuth angles, as an obstacle object or a non-obstacle object, as described in the first embodiment.

The velocity threshold value thv, the variation threshold value thp, the distance range, the velocity range, the variation range, the intensity range, the frequency threshold value, the frequency difference threshold value, the ratio threshold value, and the like may be changed in accordance with the relative distance and the intensity of the reflection signal for each object. Alternatively, if the azimuth angle of an object can be detected as described above, those values may be changed in accordance with the azimuth angle.

In the first embodiment, the quantization section 106, the signal analysis section 107, and the operation section 108 of the object identification device 1 may be realized by the same or different ECUs (Electronic Control Units) that are mainly composed of a CPU (Central Processing Unit), a ROM (Read Only Memory), a RAM (Random Access Memory), and the like. In this case, the storage section not shown may be realized by the RAM.

While the invention has been described in detail, the foregoing description is in all aspects illustrative and not restrictive. It is understood that numerous other modifications and variations can be devised without departing from the scope of the invention.

Industrial Applicability

The present invention is applicable to an object identification device capable of identifying an object as an obstacle object or a non-obstacle object. For example, the present invention is applicable to object identification devices provided in mobile bodies such as vehicles.

DESCRIPTION OF THE REFERENCE CHARACTERS 1 object identification device
101 transmission signal generation section
102 transmission section
103 reception section
104 mixing section
105 wave filtering section
106 quantization section
107 signal analysis section
108 operation section

The invention claimed is:

1. An object identification device which identifies an object, based on a transmission signal and a reflection signal caused by the object reflecting the transmission signal, the object identification device comprising:
   a measurement section configured to measure at least one of the relative distance and the relative velocity with respect to the object;
   an intensity detection section configured to detect the intensity of the reflection signal; and
   an object identification section configured to identify the object which can be an obstacle object, based on at least one of the relative velocity and the variation in the relative distance, and on the variation in the intensity,
   wherein the object identification section includes an operation section configured to, if it is determined that the absolute value of the relative velocity of the object is equal to or smaller than a velocity threshold value, determine that the object is not a target to be identified as an obstacle object or a non-obstacle object, before the object is identified as an obstacle object or a non-obstacle object.

2. The object identification device according to claim 1, wherein
   the object identification section includes:
   a relative distance variation determination section configured to determine whether or not the variation in the relative distance is out of a predetermined range of variations in the relative distance;
   an intensity variation determination section configured to determine whether or not the variation in the intensity is out of a predetermined range of variations in the intensity; and
   an obstacle identification section configured to, if the variation in the relative distance is out of the predetermined range of variations in the relative distance, and the variation in the intensity is out of the predetermined range of variations in the intensity, identify the object as an obstacle object.

3. The object identification device according to claim 1, wherein
   the object identification section includes:
   a velocity determination section configured to determine whether or not the absolute value of the relative velocity is larger than a predetermined velocity threshold value;
   an intensity variation determination section configured to determine whether or not the variation in the intensity is out of a predetermined range of variations in the intensity; and
   an obstacle identification section configured to, if the absolute value of the relative velocity is larger than the predetermined velocity threshold value, and the variation in the intensity is out of the predetermined range of variations in the intensity, identify the object as an obstacle object.

4. The object identification device according to claim 1, wherein
   the object identification section includes:
   a relative distance variation determination section configured to determine whether or not the variation in the relative distance is out of a predetermined range of variations in the relative distance;
   a frequency determination section configured to determine whether or not the frequency that the variation in the intensity becomes out of a first predetermined range in a predetermined period is equal to or higher than a predetermined frequency threshold value; and
   an obstacle identification section configured to, if the variation in the relative distance is out of the predetermined range of variations in the relative distance, and the frequency is equal to or higher than the predetermined frequency threshold value, identify the object as an obstacle object.

5. The object identification device according to claim 1, wherein
   the object identification section includes:
   a velocity determination section configured to determine whether or not the absolute value of the relative velocity is larger than a predetermined velocity threshold value;
   a frequency determination section configured to determine whether or not the frequency that the variation in the intensity becomes out of a first predetermined range in a predetermined period is equal to or higher than a predetermined frequency threshold value; and
   an obstacle identification section configured to, if the absolute value of the relative velocity is larger than the predetermined velocity threshold value, and the frequency is equal to or higher than the predetermined frequency threshold value, identify the object as an obstacle object.

6. The object identification device according to claim 1, wherein
   if the variation in the relative distance is out of a predetermined range of variations in the relative distance, and the difference in frequencies calculated based on comparison between the variation in the intensity and each of predetermined ranges different from each other in a predetermined period is equal to or larger than a predetermined threshold value, the object identification section identifies the object as an obstacle object.

7. The object identification device according to claim 6, wherein
   the object identification section includes:
   a first counting section configured to count, as a first frequency, the number of times the variation in the intensity becomes out of a first predetermined range in a first predetermined period;
   a second counting section configured to count, as a second frequency, the number of times the variation in the intensity becomes out of a second predetermined range which is smaller than the first predetermined range in a second predetermined period; and
   a frequency difference calculation section configured to calculate, as the difference in frequencies, the difference between the first frequency and the second frequency.

8. The object identification device according to claim 6, wherein
   the object identification section includes:
   a first counting section configured to count, as a first frequency, the number of times the variation in the intensity becomes out of a first predetermined range in a first predetermined period;
   a second counting section configured to count, as a second frequency, the number of times the variation in the intensity becomes within a second predetermined range which is smaller than the first predetermined range in a second predetermined period; and
   a frequency difference calculation section configured to calculate, as the difference in frequencies, the difference between the first frequency and the second frequency.

9. The object identification device according to claim 6, wherein
   the object identification section includes:
   a first counting section configured to count, as a first frequency, the number of times the period from when the variation in the intensity becomes out of a first predetermined range to when the variation in the intensity becomes within the first predetermined range reaches a predetermined time length, in a first predetermined period;
a second counting section configured to count, as a second frequency, the number of times the period from when the variation in the intensity becomes out of a second predetermined range which is smaller than the first predetermined range to when the variation in the intensity becomes within the second predetermined range reaches a predetermined time length, in a second predetermined period; and
a frequency difference calculation section configured to calculate, as the difference in frequencies, the difference between the first frequency and the second frequency.

10. The object identification device according to claim 6, wherein
the object identification section includes:
a first counting section configured to count, as a first frequency, the number of times the period from when the variation in the intensity becomes out of a first predetermined range to when the variation in the intensity becomes within the first predetermined range reaches a predetermined time length, in a first predetermined period;
a second counting section configured to count, as a second frequency, the number of times the period from when the variation in the intensity becomes within a second predetermined range which is smaller than the first predetermined range to when the variation in the intensity becomes out of the second predetermined range reaches a predetermined time length, in a second predetermined period; and
a frequency difference calculation section configured to calculate, as the difference in frequencies, the difference between the first frequency and the second frequency.

11. The object identification device according to claim 1, wherein
if the relative velocity is larger than a predetermined velocity threshold value, and the difference in frequencies calculated based on comparison between the variation in the intensity and each of predetermined ranges different from each other in a predetermined period is equal to or larger than a predetermined threshold value, the object identification section identifies the object as an obstacle object.

12. The object identification device according to claim 11, wherein
the object identification section includes:
a first counting section configured to count, as a first frequency, the number of times the variation in the intensity becomes out of a first predetermined range in a first predetermined period;
a second counting section configured to count, as a second frequency, the number of times the variation in the intensity becomes out of a second predetermined range which is smaller than the first predetermined range in a second predetermined period; and
a frequency difference calculation section configured to calculate, as the difference in frequencies, the difference between the first frequency and the second frequency.

13. The object identification device according to claim 11, wherein
the object identification section includes:
a first counting section configured to count, as a first frequency, the number of times the variation in the intensity becomes out of a first predetermined range in a first predetermined period;
a second counting section configured to count, as a second frequency, the number of times the variation in the intensity becomes within a second predetermined range which is smaller than the first predetermined range in a second predetermined period; and
a frequency difference calculation section configured to calculate, as the difference in frequencies, the difference between the first frequency and the second frequency.

14. The object identification device according to claim 11, wherein
the object identification section includes:
a first counting section configured to count, as a first frequency, the number of times the period from when the variation in the intensity becomes out of a first predetermined range to when the variation in the intensity becomes within the first predetermined range reaches a predetermined time length, in a first predetermined period;
a second counting section configured to count, as a second frequency, the number of times the period from when the variation in the intensity becomes out of a second predetermined range which is smaller than the first predetermined range to when the variation in the intensity becomes within the second predetermined range reaches a predetermined time length, in a second predetermined period; and
a frequency difference calculation section configured to calculate, as the difference in frequencies, the difference between the first frequency and the second frequency.

15. The object identification device according to claim 11, wherein
the object identification section includes:
a first counting section configured to count, as a first frequency, the number of times the period from when the variation in the intensity becomes out of a first predetermined range to when the variation in the intensity becomes within the first predetermined range reaches a predetermined time length, in a first predetermined period;
a second counting section configured to count, as a second frequency, the number of times the period from when the variation in the intensity becomes within a second predetermined range which is smaller than the first predetermined range to when the variation in the intensity becomes out of the second predetermined range reaches a predetermined time length, in a second predetermined period; and
a frequency difference calculation section configured to calculate, as the difference in frequencies, the difference between the first frequency and the second frequency.

16. The object identification device according to claim 1, wherein
if the variation in the relative distance is out of a predetermined range of variations in the relative distance, and the ratio of the variation in the intensity to the variation in the relative distance is equal to or larger than a predetermined threshold value, the object identification section identifies the object as an obstacle object.

17. The object identification device according to claim 1, wherein
if the variation in the relative distance is out of a predetermined range of variations in the relative distance, and the frequency that the ratio of the variation in the intensity to the variation in the relative distance becomes equal to or larger than a predetermined ratio threshold value in a predetermined period is equal to or higher than a predetermined frequency threshold value, the object identification section identifies the object as an obstacle object.

18. The object identification device according to claim 1, wherein
if the variation in the relative distance is out of a predetermined range of variations in the relative distance, and the difference in frequencies calculated based on comparison between the ratio of the variation in the intensity to the variation in the relative distance and each of predetermined ratio threshold values different from each other in a predetermined period is equal to or larger than a predetermined frequency difference threshold value, the object identification section identifies the object as an obstacle object.

19. The object identification device according to claim 18, wherein
the object identification section includes:
a first counting section configured to count, as a first frequency, the number of times the ratio of the variation in the intensity to the variation in the relative distance becomes equal to or larger than a first predetermined ratio threshold value in a first predetermined period;
a second counting section configured to count, as a second frequency, the number of times the ratio of the variation in the intensity to the variation in the relative distance becomes equal to or larger than a second predetermined ratio threshold value which is larger than the first predetermined ratio threshold value in a second predetermined period; and
a frequency difference calculation section configured to calculate, as the difference in frequencies, the difference between the first frequency and the second frequency.

20. The object identification device according to claim 1, wherein
the object identification section includes:
a stopping section configured to, if the relative distance to an object is out of a predetermined identification range, stop identification of the object as an obstacle or a non-obstacle object.

21. The object identification device according to claim 20, wherein
the object identification section further includes:
an obstacle determination section configured to, if the relative distance to an object is out of the predetermined identification range, determine the object to be an obstacle object.

22. An object identification method for identifying an object, based on a transmission signal and a reflection signal caused by the object reflecting the transmission signal, the object identification method comprising:
a measurement step of measuring at least one of the relative distance and the relative velocity with respect to the object;
an intensity detection step of detecting the intensity of the reflection signal; and
an object identification step of identifying the object which can be an obstacle object, based on at least one of the relative velocity and the variation in the relative distance, and on the variation in the intensity,
wherein the object identification step includes a step of, if it is determined that the absolute value of the relative velocity of the object is equal to or smaller than a velocity threshold value, determining that the object is not a target to be identified as an obstacle object or a non-obstacle object, before the object is identified as an obstacle object or a non-obstacle object.

* * * * *